Feb. 14, 1950     E. E. LIBMAN     2,497,614
STABLE VERTICAL
Filed Jan. 10, 1947
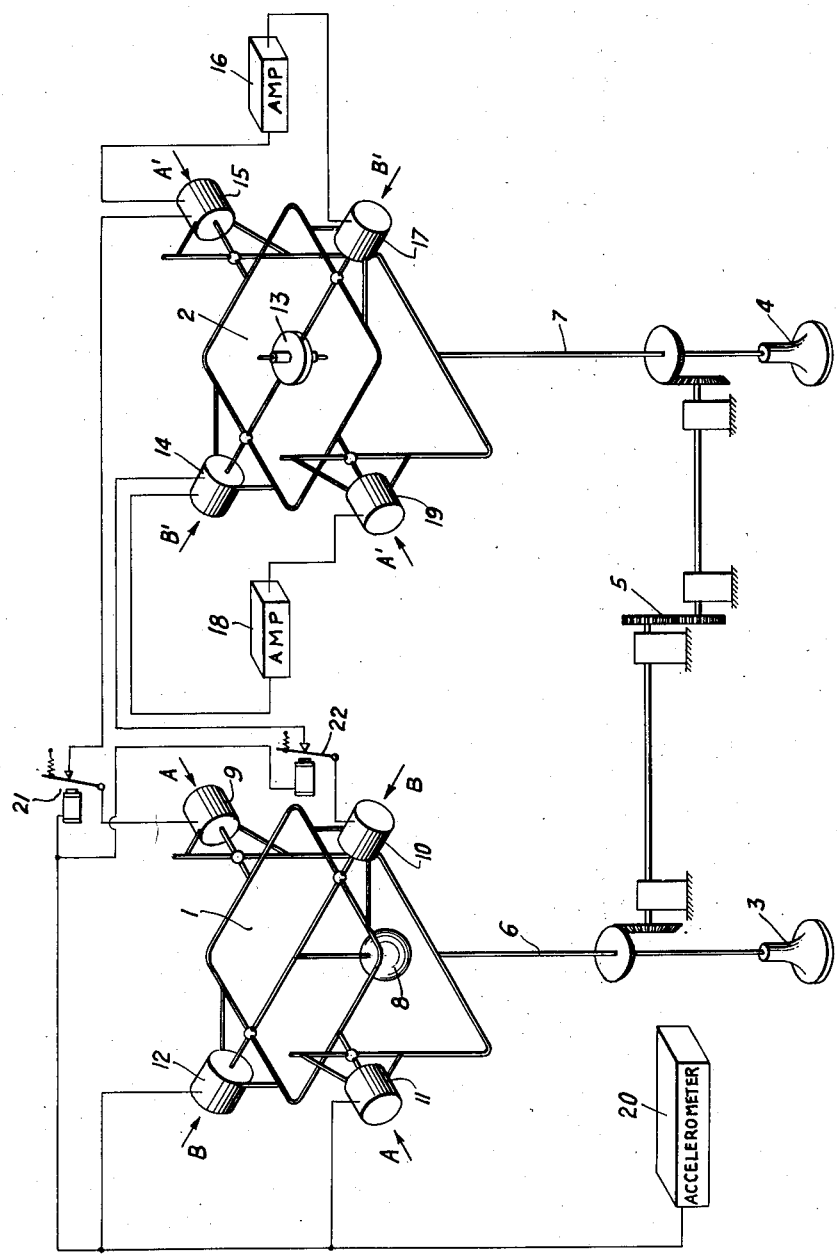
INVENTOR.
*Earl E. Libman*,
BY
*ATTORNEY.*

Patented Feb. 14, 1950

2,497,614

UNITED STATES PATENT OFFICE 2,497,614

STABLE VERTICAL

Earl E. Libman, Brooklyn, N. Y., assignor to Control Instrument Company, Inc., Brooklyn, N. Y., a corporation of New York Application January 10, 1947, Serial No. 721,435

5 Claims. (Cl. 74—5.47)

1

This invention relates to improvements in a class of instruments frequently called stable verticals which are employed to establish and maintain a reference axis, while aboard a moving object, substantially perpendicular to the surface of the earth at or above which it may be at any given instant, regardless of the fact that the moving object may also have motions about its longitudinal and transverse axes.

In accordance with the invention, it is proposed to detect any motion of a freely swinging pendulum with reference to the object upon which it is mounted, analyze said motion and reject such portions thereof as are occasioned by accelerations other than gravitation, and to then convert the motions caused by gravity into a force which will coerce the axes of a gyroscope having three degrees of freedom so that said axes will remain parallel to the mean position of said pendulum.

The above and other objects and the manner of their accomplishment will appear more clearly from the following description, when taken in connection with the accompanying drawing which shows one method of accomplishing the desired end; it being expressly understood that the said drawing is merely utilized for the purpose of describing the invention as a whole and not to define the limits thereof, reference being made to the appended claims for this purpose.

The drawing is a schematic representation of a system for carrying out the purposes of the invention.

Referring more particularly to the drawing, the instrument is shown as comprising two gimbal mountings 1 and 2, freely rotatable in their supports 3 and 4 which are mounted on a common base, and connected by means of a system of gears, shafts and associated supports generally shown as 5 so that the supporting shafts 6 and 7 turn through equal angle and in the same direction.

A pendulum 8 is mounted in the frame of gimbal 1 which also supports two control generators 9 and 10 mounted about the gimbal 1 in such a manner that if the pendulum should rotate about the axis A—A, the shaft of generator 9 will be displaced, and should it rotate about the axis B—B, the shaft of generator 10 will be displaced. Associated with said axes, respectively, are two normally open magnetic locks 11 and 12 which, when actuated, can inhibit rotation of said axes and open the electrical circuits between control generators 9 and 10 and control transformers 14 and 15. A gyroscope 13 is mounted in the frame of gimbal 2 which also supports the control transformers 14 and 15. Said transformers are mounted about the gimbal 2 in such a manner that the axis of control transformer 14 on the B'—B' axis of said gimbal is parallel to that of

2 control generator 10 on the B—B axis of gimbal 1, and the axis of control transformer 15 on the A'—A' axis of gimbal 2 is parallel to that of control generator 9 on the A—A axis of gimbal 1 when the vertical axes of the pendulum 8 and the gyroscope 13 are parallel.

While the object upon which the instrument is mounted is in motion with respect to the earth's surface, the force of gravitation will cause the pendulum to swing, displacing either or both shafts of control generators 9, 10.

Lack of positional correspondence between the shafts of control generator 9 due to pendulum 8 rotating about axis A—A, and of control transformer 15 will cause an electrical unbalance, since control generator 9 and control transformer 15 are connected through a cable and that unbalance is sensed by the amplifier 16 which is connected to the control motor 17.

The output of amplifier 16 is made some function of the degree of unbalance of control generator 9 and control transformer 15 and is of sufficient magnitude to drive the motor 17 which will apply a torque tending to rotate the gyroscope 13 on axis B'—B'. The gyroscope, in resisting the change in positioning, will precess about the axis A'—A' until the control generator 9 and control transformer 15 are again in agreement, whereupon the precessing torque is removed for lack of excitation of amplifier 16.

In a similar manner lack of positional correspondence between the shaft of control generator 10 and control transformer 14, due to pendulum 8 rotating about the axis B—B, will cause an electrical unbalance, since control generator 10 and control transformer 14 are connected through a cable, and that unbalance is sensed by amplifier 18 which is connected to control motor 19.

The output of the amplifier 18 is likewise made a function of the degree of unbalance between control generator 10 and control transformer 14 and is of sufficient magnitude to drive the motor 19 which applies a torque tending to rotate the gyroscope about the A'—A' axis. The gyroscope, in resisting this change in positioning, will precess about the B'—B' axis until the control generator 10 and the control transformer 14 are again in positional agreement, whereupon the precessing torque is removed for lack of excitation of amplifier 18.

For any motion not identically about either axis, but having components about both, both systems will function simultaneously to realign the spin axis of the gyroscope with the direction of the pendulum.

If the response of the system were immediate, the gyroscope would follow each and every motion of the pendulum even when, due to sudden movement or periodic vibration of the supporting plane, the pendulum might oscillate; however, the gyroscope has a large inertia, and the coercive force can be made such that the coupling stiffness is small, or compliance is large, permitting the gyroscope whose natural period would be long as compared with the pendulum to assume the mean position of the pendulum.

If the gimbals 1 and 2 have occasion to be turned through large angles, certain of their degrees of freedom may be lost, which may be provided for by additional gimbals not shown in the schematic diagram.

If the pendulum should be acted upon by lateral accelerations, it will be displaced according to the rate of change of velocity to which it is subjected, and in the opposite direction thereto. Such displacement will be transmitted to the gyroscope, in the manner above indicated, to adversely affect the accuracy of the vertical so maintained. For such contingencies a conventional acceleration sensitive switch 20, well known in the art, may be used to lock the position of the pendulum and open the control circuits for the duration of such accelerations, so that there is no motion of the pendulum for the duration of the undesired accelerations permitting the gyroscope to "float" freely for that interval. For the duration of the lateral acceleration, the acceleration sensitive element 20 activates both locks 11 and 12 so that the gimbal axes with which they are associated are no longer free to rotate, thus preventing all pendulum motion for the duration of the lateral acceleration, and at the same time element 20 opens the leads between the control generators 9 and 10 and their associated control transformers 14 and 15 at switches 21 and 22. The gyroscope is thus "free" for the interval of the acceleration and again controlled when the acceleration vanishes causing element 20 to "let go" and deactivate the locks and reconnect the control transformers.

What is claimed is:

1. In an instrument to determine and maintain its axis perpendicular to the plane tangent to the surface of the earth at or above which said instrument may be at any given instant, a pendulum, a gyroscope, individual means for mounting said pendulum and said gyroscope so as to afford to each three degrees of rotation about a fixed vertical, a fixed horizontal and a tiltable horizontal axis in said mounting means, means interconnecting said mounting means for maintaining parallel said fixed vertical and said fixed horizontal axis, and a servo mechanism controlled by said pendulum and acting on said gyroscope for precessing and coercing said gyroscope so that its axis of rotation is parallel to said pendulum.

2. In an instrument to determine and maintain its axis perpendicular to the plane tangent to the surface of the earth at or above which said instrument may be at any given instant, a pair of gimbals each having an outer ring and at least one inner ring, a pendulum supported in one of said gimbals and a gyroscope supported in the other of said gimbals, means to couple said gimbals so that their outer rings define parallel planes, and a servo mechanism coupling the inner gimbal ring of said pendulum supporting mount to the inner rings of said gyroscope supporting mount, said servo mechanism converting the pendulum motion into precessing torques to coerce said gyroscope into positional agreement with said pendulum.

3. In an instrument to determine and maintain its axis perpendicular to the plane tangent to the surface of the earth at or above which said instrument may be at any given instant, a pair of gimbals each having an outer ring and at least one inner ring, a pendulum supported in one of said gimbals and a gyroscope supported in the other of said gimbals, means to couple said gimbals so that their outer rings define parallel planes, and a servo mechanism of large compliance coupling the inner ring of one gimbal to the inner rings of the other, said servo mechanism converting pendulum motion into precessing torques to coerce said gyroscope into positional agreement with the average position of said pendulum.

4. In an instrument to determine and maintain its axis perpendicular to the plane tangent to the surface of the earth at or above which said instrument may be at any given instant, a pendulum, means for mounting the same so as to permit it to respond freely to gravitational and other accelerative forces, a gyroscope, individual means for mounting said gyroscope so as to provide it with three degrees of rotation, mechanical means interconnecting said pendulum support and said gyroscope support so that their relative positions remain unchanged, a servo mechanism for detecting and correcting any positional deviations between said pendulum and said gyroscope, said servo mechanism having sufficient stiffness to cause said gyroscope to follow the average position only of said pendulum, and means responsive to accelerative forces other than gravitation coacting with said servo mechanism to prevent the motion of the pendulum caused thereby from affecting the orientation of the gyroscope.

5. An instrument to determine and maintain its axis perpendicular to the plane tangent to the surface of the earth at or above which said instrument may be at any given instant, comprising a pendulum, a gyroscope, individual means for mounting said pendulum and said gyroscope each with at least three axes of rotation, a slow acting follow up servo mechanism controlled by said pendulum and acting on said gyroscope to precess the same and cause it to assume the mean position of said pendulum at any instant, and means to interrupt the action of said servo mechanism when the position assumed by the pendulum is due to an accelerative force other than gravitation.

EARL E. LIBMAN.

REFERENCES CITED

The following references are of record in the file of this patent:

UNITED STATES PATENTS

| Number | Name | Date |
|---|---|---|
| 1,651,845 | Sperry | Dec. 6, 1927 |
| 2,044,343 | Angeloni | June 16, 1936 |
| 2,315,500 | Carter | Apr. 6, 1943 |
| 2,405,058 | Ross | July 30, 1946 |

FOREIGN PATENTS

| Number | Country | Date |
|---|---|---|
| 364,625 | Great Britain | Dec. 29, 1931 |